(12) United States Patent
Bäurle et al.

(10) Patent No.: US 7,245,510 B2
(45) Date of Patent: Jul. 17, 2007

(54) METHOD AND APPARATUS FOR CONDITIONAL RESPONSE TO A FAULT CONDITION IN A SWITCHING POWER SUPPLY

(75) Inventors: Stefan Bäurle, San Jose, CA (US); Alex B. Djenguerian, Saratoga, CA (US); Kent Wong, Fremont, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 11/178,132

(22) Filed: Jul. 7, 2005

(65) Prior Publication Data
US 2007/0008749 A1  Jan. 11, 2007

(51) Int. Cl.
*H02M 3/335* (2006.01)
*H02H 7/122* (2006.01)
(52) U.S. Cl. .............................. 363/21.12; 363/21.17; 363/56.01
(58) Field of Classification Search .............. 363/21.12, 363/21.15, 21.16, 21.17, 21.18, 56.01, 97
See application file for complete search history.

(56) References Cited

U.S. PATENT DOCUMENTS

| | | | | | |
|---|---|---|---|---|---|
| 5,675,485 | A | * | 10/1997 | Seong | 363/97 |
| 5,687,066 | A | * | 11/1997 | Cook, II | 363/89 |
| 5,835,361 | A | * | 11/1998 | Fitzgerald | 363/21.03 |
| 6,088,244 | A | * | 7/2000 | Shioya et al. | 363/21.07 |
| 6,094,362 | A | * | 7/2000 | Domingo | 363/56.1 |
| 6,188,588 | B1 | * | 2/2001 | Hemena et al. | 363/21.18 |
| 6,816,395 | B2 | * | 11/2004 | Kobori et al. | 363/97 |
| 6,839,247 | B1 | * | 1/2005 | Yang et al. | 363/21.11 |
| 6,980,443 | B2 | * | 12/2005 | Nagano et al. | 363/21.12 |

OTHER PUBLICATIONS

System General Corporation, Product Specification SG6846, "Highly-Integrated Green-Mode PWM Controller," Version 1.0, www.sg.com.tx, pp. 1-14, Sep. 30, 2004.

(Continued)

*Primary Examiner*—Bao Q. Vu
(74) *Attorney, Agent, or Firm*—Blakely Sokoloff Taylor & Zafman LLP (57) ABSTRACT

Techniques are disclosed to regulate an output of a power converter. One example power converter includes an energy transfer element coupled between an input and an output of the power converter. A switch included in the power converter is coupled to the input of the energy transfer element. The power converter also includes a controller circuit coupled to the switch. The controller circuit is also coupled to receive a feedback signal representative of the output of the power converter and coupled to receive a signal representative of the power converter input voltage. The controller circuit is coupled to control switching of the switch to provide a regulated output parameter at the output of the power converter in response to the feedback signal. The controller circuit is coupled to latch the power converter into an off state in response to a detection of a loss of regulation of a power converter output parameter if the power converter input voltage is above a threshold level. The controller circuit is also unresponsive to the signal representative of the power converter input voltage while the power converter output parameter is in regulation.

18 Claims, 5 Drawing Sheets

OTHER PUBLICATIONS

System General Corporation, Application Note AN6846, "Applying SG 6846 to Control a Flyback Power Supply with Surge Current Output," Version 1.0, www.sg.com.tw, pp. 1-12, Oct. 14, 2004.

System General Corporation, Demo Board Manual, "PM06002-00," Version A.0, www.sg.com.tx, 2004.

Fairchild Semiconductor Corporation, "FSDM07652R, Green Mode Fairchild Power Switch (FPS™)," Version 1.0.4, www.fairchildsemi.com, pp. 1-19, 2004.

Power Integrations, Inc., "TNY263-268, TinySwitch®-II Family: Enhanced, Energy Efficient, Low Power Off-line Switcher," pp. 1-24, Apr. 2005.

Power Integrations, Inc., "TNY242-250, TOPSwitch®-GX Family: Extended Power, Design Flexible, EcoSmart®, Integrated Off-line Switcher," pp. 1-52, Apr. 2005.

* cited by examiner

METHOD AND APPARATUS FOR CONDITIONAL RESPONSE TO A FAULT CONDITION IN A SWITCHING POWER SUPPLY

BACKGROUND

1. Technical Field

The present invention relates generally to electronic circuits, and more specifically, the invention relates to circuits that respond to fault conditions.

2. Background Information

Off-line switching power supplies generally use a control loop for regulating an output parameter such as the output voltage(s) and or current(s). For safety reasons it is often necessary that these power supplies have a way to help protect the entire system in case of a fault condition where for example the regulation is lost or the power converter exceeds a temperature threshold. Otherwise, the output circuitry or the attached load or in worst case a person touching the output or power converter enclosure may be harmed under such a condition.

A loss of regulation or exceeding a temperature threshold, however, can have various causes in a power supply. Firstly, a loss of regulation may be caused by a defect component in the control loop. An example would be a faulty optical coupler typically used for coupling a feedback signal across the isolation barrier from the output or secondary back to the input or primary side of the power supply.

Secondly, a loss of regulation may be caused by an output overload condition or an output short circuit condition. In the case of an output overload condition, the output voltage drops below its regulation value once the power supply cannot deliver the requested power anymore. In the case of an output short circuit condition, the output voltage drops close to zero. In both cases the power demanded exceeds the capability of the power supply. The regulation is lost.

A loss of regulation can also occur during a normal power down, such as for example when the power supply is unplugged from the line, because once the alternating current (AC) input voltage is removed the input voltage to the power supply will eventually fall so low that the converter is unable to deliver the output power and the regulation will be lost. Another example for this last cause of lost regulation is a temporary sag in the AC or line input voltage. Under conditions where the AC voltage sags, the temperature of various components in the power converter typically come under additional thermal stress, which in turn can lead to individual components or the complete converter exceeding a safe temperature threshold value.

BRIEF DESCRIPTION OF THE DRAWINGS

The present invention detailed illustrated by way of example and not limitation in the accompanying Figures.

DETAILED DESCRIPTION

Examples for an embodiment of a power supply in which there are conditional responses to fault conditions in accordance with the teaching of the present invention are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, characteristics, combinations and/or sub-combinations described below and/or shown in the drawings may be combined in any suitable manner in one or more embodiments in accordance with the teachings of the present invention.

For one embodiment, in certain applications a conditional response to a fault condition in a power supply is provided in accordance with the teachings of the present invention. An example application would be a power supply for a printer. Under certain circumstances, the power supply should latch off if for example a loss of regulation is detected or if for example a temperature threshold is exceeded. Those circumstances include output short circuit or output overload or a broken control loop due to a faulty component while the power supply input voltage is within the normal operating range or in other words above a threshold value that is set in the design of the power supply to meet the normal operating specifications of that supply. No automatic restart attempt should be undertaken. Otherwise, the motor transporting the paper in an inkjet printer may be damaged for instance in case the paper is jammed. During a normal power down or missing line cycle or prolonged period of low input voltage, however, a latching shutdown in response to a fault condition should be avoided. Under this condition an automatic restart is desirable when the input voltage again returns to within the normal operating range of the power supply.

Methods and apparatuses are disclosed herein that address the problem of control systems that are not able to detect the nature of the cause for the fault condition. Following detection of a fault condition, the designer can choose between a latching shutdown when the input voltage is above a threshold level, or a hysteretic or automatic restart shutdown if the fault condition is due to the input voltage being below a threshold level. For instance, for one embodiment the power supply initiates a restart attempt when the input voltage again rises above a threshold level. For one embodiment, a power supply controller can differentiate the nature of the fault condition and decide different actions depending on the additional information received after the fault condition has been detected provided in accordance with the teachings of the present invention. For one embodiment, this has the benefit of allowing both fault condition detection and input voltage sensing to be performed on a single pin of an integrated circuit controller circuit with the integrated circuit being latched into an off condition if the input voltage is above a threshold value following detection of a fault condition.

Figure 1A:
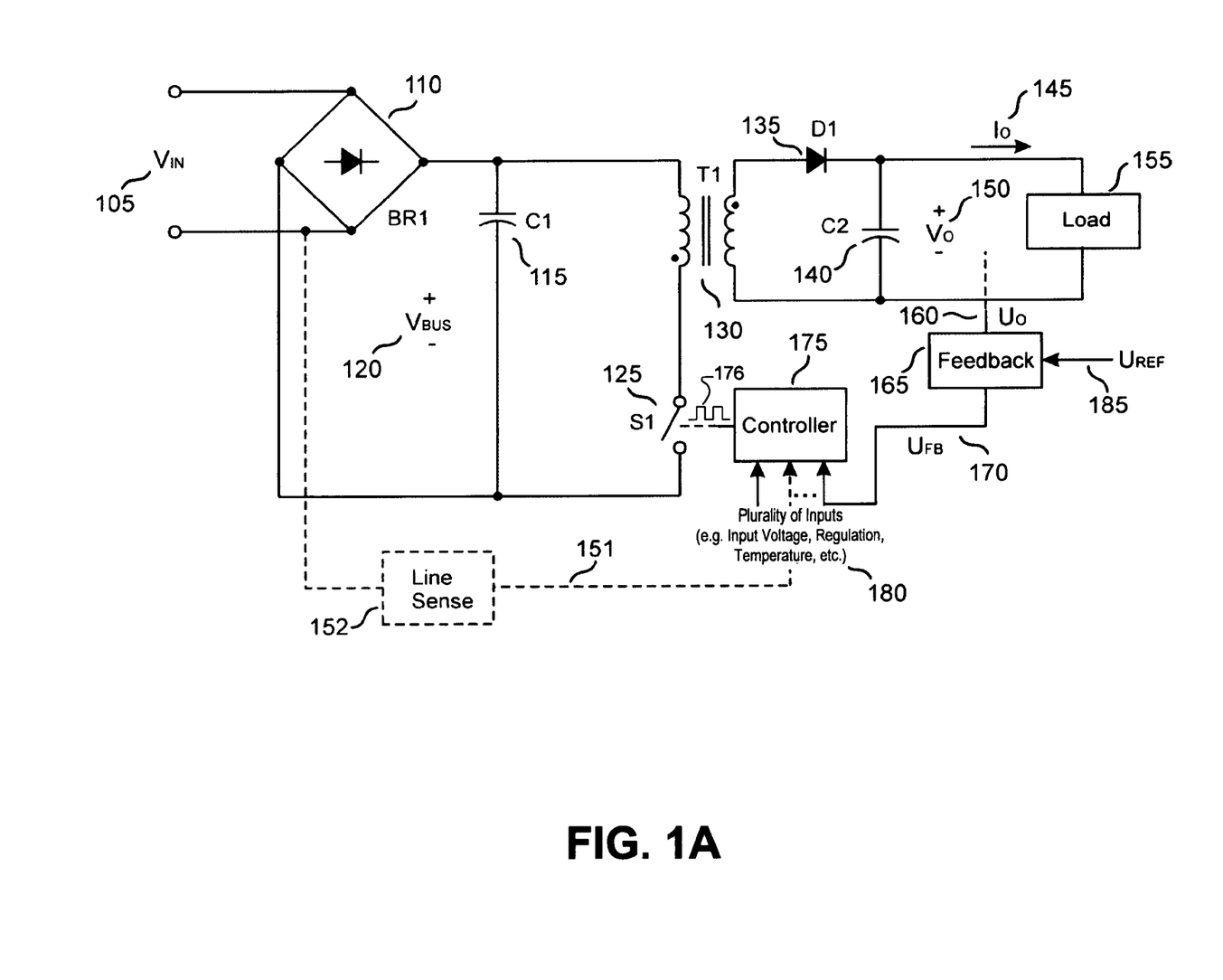
FIG. 1A is an example schematic for an embodiment of a power converter in which there are conditional responses to fault conditions in accordance with the teaching of the present invention.

FIG. 1A shows an example a power converter where one or more of a plurality of inputs 180 are coupled to a controller circuit of the power converter to detect a fault condition in accordance with the teachings of the present invention. Those signals included in the plurality of inputs 180 can indicate that a fault is present in the power converter and can include, but are not limited to, one or more of a signal representative of the line input voltage, a regulated output parameter of the power supply and/or a thermal signal. For example, the signal representative of the regulated output parameter of the power supply may be employed to indicate a fault condition in the power converter of a loss of regulation of the output parameter of the power converter. Similarly, the thermal signal may be representative of a temperature of a component within the power converter and may therefore be employed to indicate that there is a thermal fault condition in the power converter. The plurality of inputs 180 may therefore be used to first detect a fault condition and then determine the reason for the fault condition including for example signals representative of an AC input voltage or DC bus (bulk) voltage in accordance with the teachings of the present invention. As will be discussed, various examples of the power converter for an embodiment are coupled to have conditional responses to the detected fault conditions in accordance with the teachings of the present invention.

As shown in the illustrated example, the AC line voltage $V_{IN}$ 105 is rectified by the bridge rectifier BR1 110 and smoothed with the bulk capacitor C1 115. The power is delivered to the load 155 via an energy transfer element T1 130 in response to the switching of a power switch S1 125, which is coupled to the input of the energy transfer element T1 130. In the example of FIG. 1A, the energy transfer element T1 130 is illustrated as a transformer. The transformer output voltage is rectified and smoothed by the rectifier D1 135 and the capacitor C2 140. The output parameter, such as output voltage Vo 150, output current $I_O$ 145, or a combination of Vo 150 and $I_O$ 145, is regulated via the feedback circuit 165 and the controller 175.

For one embodiment, the feedback circuit 165 is directly coupled to the output of the power supply to sense the output of the power supply. For one embodiment, feedback circuit 165 compares a representation of the output voltage $U_O$ 160 with a reference voltage $U_{REF}$ 185 for generating the feedback signal $U_{FB}$ 170. This feedback signal $U_{FB}$ 170 is processed by the controller 175 for regulating the output parameter such as voltage $V_O$ 150 or output current $I_O$ 145. For one embodiment, feedback signal $U_{FB}$ can be one of the plurality of inputs 170 providing a means of detecting a loss of regulation of an output parameter such as voltage $V_O$ 150 or output current $I_O$ 145. As shown, controller 175 generates a drive signal 176 which is coupled to control the switching of power switch S1 125 to regulate an output parameter of the power converter. For one embodiment, the output 151 of an input line sense circuit 152 is one of a plurality of inputs 180 to controller 175. For one embodiment, the function of line sense circuit 152 is to monitor the magnitude of the AC input voltage $V_{IN}$ 105.

Figure 1B:
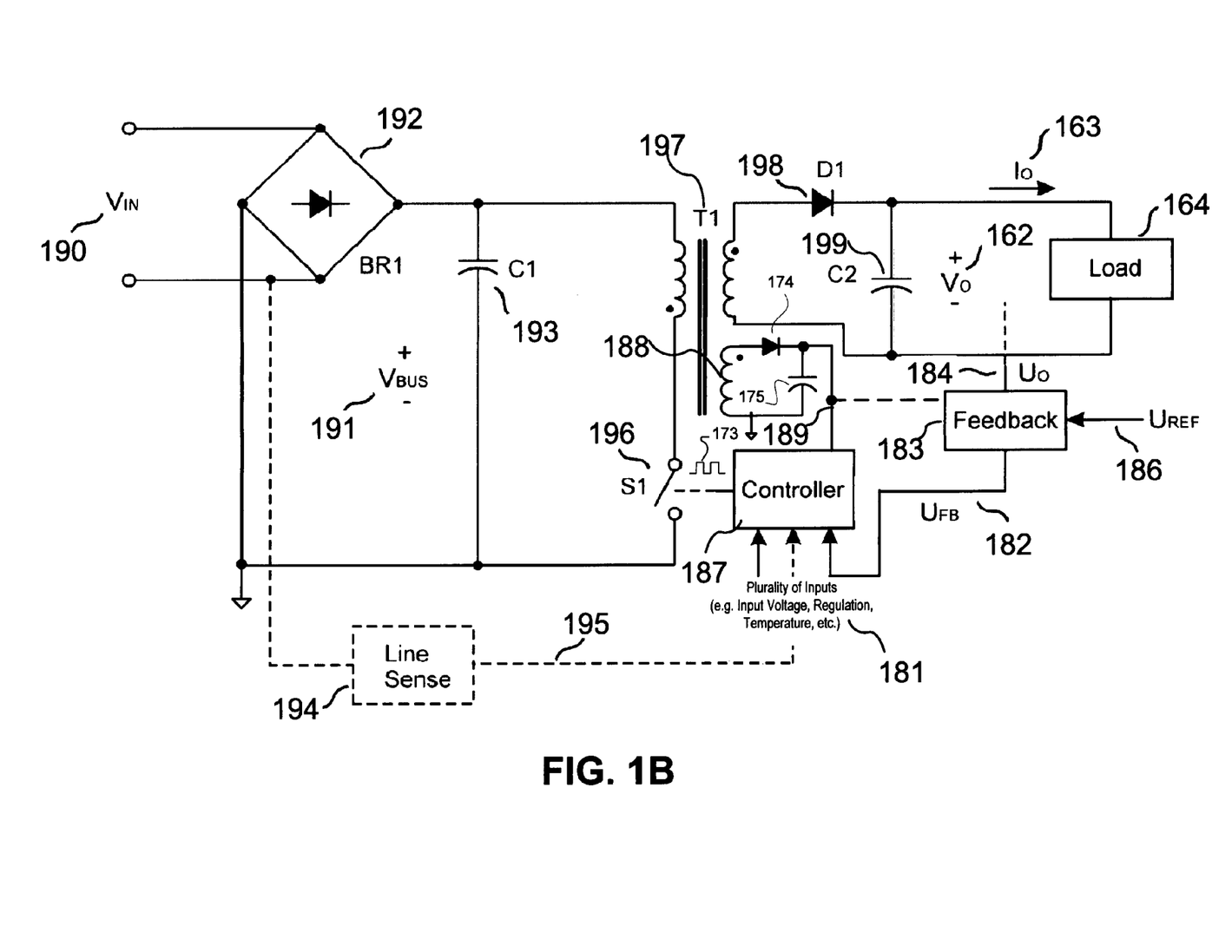
FIG. 1B is another example schematic for an embodiment of a power converter in which there are conditional responses to fault conditions in accordance with the teaching of the present invention.

FIG. 1B shows an example a power converter sharing many similarities with the power converter of FIG. 1A but with the addition of a bias winding 188 forming part of the energy transfer element 197. In common with the circuit of FIG. 1A, the AC line voltage $V_{IN}$ 190 is rectified by the bridge rectifier BR1 192 and smoothed with the bulk capacitor C1 193. The power is delivered to the load 164 via an energy transfer element T1 197 in response to the switching of a power switch S1 196, which is coupled to the input of the energy transfer element T1 197. As shown in the illustrated example, power switch S1 196 is switched in response to a drive signal 173 received from controller 187. In the illustrated example, controller 197 is coupled to receive a plurality of inputs 181, which includes a feedback signal $U_{FB}$ 182 from feedback circuit 183. For one example, feedback circuit 183 is coupled to receive a reference voltage $U_{REF}$ 186. In the example of FIG. 1B, the energy transfer element T1 197 is illustrated as a transformer. The transformer output voltage is rectified and smoothed by the rectifier D1 198 and the capacitor C2 199. The output parameter, such as output voltage Vo 162 or output current $I_O$ 163, is regulated via the feedback circuit 183 and the controller 187. However, the circuit of FIG. 1B has a bias winding 188 which can be used to provide a low voltage power source to supply controller 187 and/or generate an output signal representative of the output voltage 162 to the feedback circuit 183. In the case where the bias winding signal 189 is coupled to the feedback circuit 183, signal 184 is no longer required and instead the controller 187 will adapt to switch switch 196 to regulate the bias winding signal 189. Depending on the circuitry internal to feedback circuit 183, the bias winding signal being regulated can be a voltage across the bias winding 188 or a current derived from the voltage across bias winding 188. In the circuit of FIG. 1B therefore, the loss of regulation of the power converter output parameter, Vo 162, is detected by sensing the bias winding output signal 189 generated by the bias winding.

Figure 2:
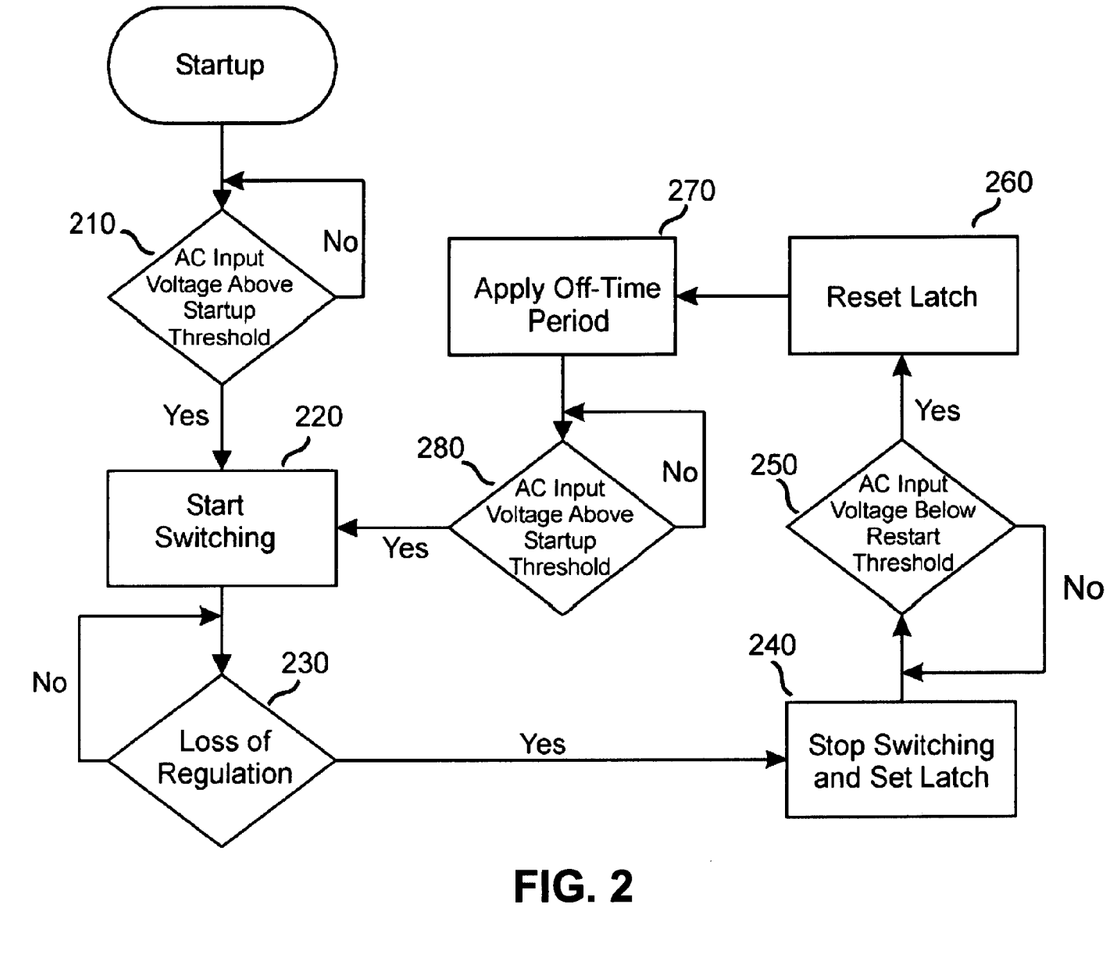
FIG. 2 is an example flow diagram for an embodiment in which there are conditional responses to fault conditions in a power converter in accordance with the teaching of the present invention in accordance with the teaching of the present invention.

FIG. 2 shows a flowchart of the operation under various fault conditions. At startup of the power supply, it is first checked that the AC input voltage is above a startup threshold level at block 210. This block confirms that the input voltage to the power supply is high enough to maintain regulation of the required output parameter.

As soon as the input voltage is high enough, switching is initiated by block 220. For the purposes of this disclosure, the term switching refers to the operation of the power switch, such as for example switch S1 125 in FIG. 1A, and is used to describe the action of delivering energy to the power converter output load.

Once the power supply has started switching, block 230 constantly monitors the control loop to check if the output parameter being regulated is still in regulation. It is appreciated that in an alternative embodiment, block 230 could instead be monitoring the temperature of one or more of the power converter power switch, such as for example switch S1 125 in FIG. 1A, or the energy transfer element or any other components within the power converter in accordance with the teachings of the present invention. The decision made at block 230 would then be whether the component or components, whose temperature is being monitored, are below a temperature threshold value.

If a temperature threshold were exceeded, this would result in stopping the switching of the power converter, as shown in block 240. For the purposes of the remaining description however, the loss of regulation is used as an indication of a fault condition.

When regulation is lost, switching is terminated and a latch set as shown at block 240. Switching can be terminated immediately regulation is lost or after a time period from the point where regulation is lost, in order to allow for conditions during the normal operation of the power converter where regulation could be lost for short periods such as very high transient load conditions.

After the regulation has been lost, block 250 then detects whether the regulation loss could be due to the AC line voltage being below a threshold, here called the restart threshold level. If the AC line voltage is above this restart threshold level, the cause of the lost regulation is assumed to be either a broken control loop or an output overload or short circuit. In all these cases the power supply is latched off.

In case the AC input is not high enough, such as for example being below the restart threshold level, the latch is reset, as shown at block 260. In this case, a normal power down or AC line sag may be the cause for the regulation loss and restart attempts are permitted.

In this example, block 270 establishes an off time period after which the power converter attempts to restart when the AC input voltage again rises above the startup threshold, as determined at block 280. For one embodiment, the off time period could be zero and the power supply operation would then immediately restart if the input voltage level is above the startup threshold, as shown in block 280. The presence of block 250 ensures the AC line is continuously monitored after the switching is stopped. For one embodiment, the input voltage startup and restart threshold levels are substantially equal. For one embodiment the circuitry to employ blocks 210 and 280 are identical, in which case processing after block 270 would continue with block 210 instead of block 280, in accordance with the teachings of the present invention. In the above example, when the power converter is in regulation corresponding to the NO output of block 230, the operation is unresponsive to the power converter input voltage in accordance with the teachings of the present invention. It is only after regulation has been lost that the input voltage is again sensed in block 250.

Figure 3:
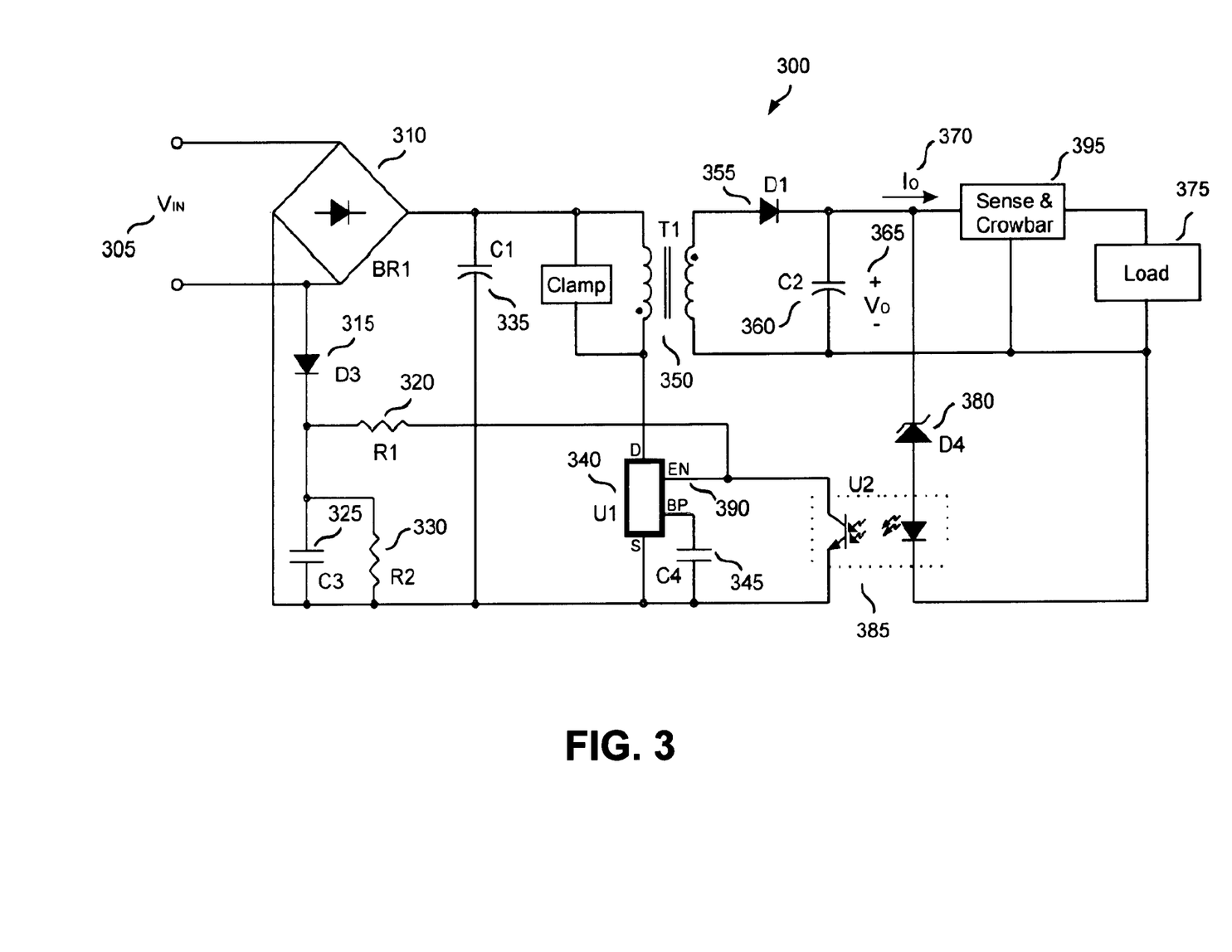
FIG. 3 is another example schematic for an embodiment of a power converter in which there are conditional responses to fault conditions in accordance with the teaching of the present invention.

FIG. 3 is an illustration of a converter 300 for an embodiment in accordance with the teachings of the present invention. As shown in the illustrated example, the feedback signal and the AC line voltage sense signal are combined on one feedback terminal EN 390 of controller 340 to reduce the number inputs to controller U1 340 and therefore reduce system cost. In another embodiment the feedback and the AC line voltage sense could be applied to separate terminals of controller U1 340.

In the example illustrated in FIG. 3, the controller U1 340 includes the switch coupled between the D and S terminals. By including the switch in the controller U1 340, system cost may be reduced. In another embodiment, the switch could also be external to controller U1 340 in accordance with the teachings of the present invention. The AC line voltage $V_{IN}$ 305 is rectified and smoothed by the bridge rectifier BR1 310 and the DC bulk capacitor C1 335. The energy transfer element T1 350 together with the switch integrated in controller U1 340 are coupled to regulate the delivery of energy to the load 375. The transformer T1 350 output voltage is rectified and smoothed by the rectifier D1 355 and the capacitor C2 360.

In the illustrated example, the regulated output parameter is the output voltage $V_O$ 365. An output voltage regulation threshold is set by Zener diode D4 380 and the forward voltage drop of optical coupler U2 385 LED. Optical coupler U2 385 couples a feedback signal across the isolation barrier to the feedback terminal EN 390 of integrated circuit U1 340. In this example, a loss of regulation of the output parameter is indicated by the loss of the feedback signal to the feedback terminal EN 390. As discussed earlier, this loss of regulation could be due to an output short circuit or overload condition at the output of the power converter for example. In addition, FIG. 3 shows a circuit 395 which can create a loss of regulation. For one embodiment, sense and crowbar circuit 395 comprises current sensing circuitry which senses the magnitude of output current $I_O$ 370 and triggers a crowbar circuit which applies a substantially short circuit across the output of the power converter if $I_O$ 370 exceeds a threshold value or exceeds a threshold value for a period of time. Circuit 395 therefore creates a loss of regulation based on an output load condition. This type of circuit can be used in for example a power converter for a printer to detect a load condition which would not in itself generate a loss of regulation but which nevertheless is undesirable since it exceeds a maximum power delivery specification set by the manufacturer of the printer. When this load condition exists for a period of time, where the period of time could be substantially zero, it is desirable for the power converter to latch off. Sense and crowbar circuit 395 provides this function and allows the power converter designer to set the threshold at which this fault condition is generated.

Capacitor C4 345 acts as bypass for the internal supply of controller U1 340. In the example of FIG. 3, controller U1 340 is adapted to be responsive to a feedback current signal flowing out of feedback terminal EN 390. In other embodiments, controller 340 could be adapted to be responsive to a feedback voltage at terminal EN 390 in accordance with the teachings of the present invention. In yet another embodiment, controller 340 could be adapted to be responsive to a feedback current signal flowing into feedback terminal EN 390. Controller 340 detects when this feedback current signal exceeds a threshold value determined by circuitry internal to controller 340. Controller 340 is adapted to control energy transfer through energy transfer element 350 in order to regulate the feedback current signal at feedback terminal EN 390. For one embodiment controller 340 uses an ON/OFF control scheme to achieve this regulation. In other embodiments, controller 340 could use pulse width modulator (PWM) voltage mode or PWM current mode or resonant mode or quasi-resonant mode control to achieve this regulation in accordance with the teachings of the present invention.

As shown in the example illustrated in FIG. 3, components 315, 320, 330 and 325 make up a line sense circuit, such as the example illustrated in FIG. 1A of the line sense block 152 shown in FIG. 1A. The AC input voltage $V_{IN}$ 305 is rectified and smoothed by the rectifier D3 315 and the capacitor C3 325. Capacitor 325 charges to the peak value of the AC input and is discharged by resistors 330 and 320 over time. The relative values of capacitor 325, resistor 330 and resistor 320 determine the value of the voltage across capacitor 325 over time when diode 315 is not conducting.

For instance, in one example, capacitor 325 has a value of 33 nF, resistor 330 has a value of 6.8 Megaohms and resistor 320 has a value of 10 Megaohms. The time constant of this combination of values would then be approximately 132 milliseconds. This time constant is chosen such that it is much longer than the cycle of an AC voltage waveform which is typically approximately 16.6 milliseconds when the AC line voltage frequency is 60 Hertz. The choice of a 132 millisecond time constant therefore ensures that the voltage across 325 is held up between AC line cycles but is discharged relatively quickly if the AC input voltage is disconnected or sags. The values of capacitor 325, resistor 330 and resistor 320 could all be increased or decreased to increase or decrease the time taken to discharge capacitor 325, whilst still benefiting from the teachings of the present invention.

In another example, the resistor 330 is not required since the current flowing in resistor 320 is adequate to provide the desired value of the voltage across 325 over time when diode 315 is not conducting. Applications which benefit from the teachings of the present invention normally require that the user of the power supply is able to reset the power supply by removing the AC input voltage and that this reset takes place in a short period of time typically between 1 and 10 seconds.

The relatively quick discharge of capacitor 325 when AC input voltage is removed is therefore the reason that line voltage sensing is not achieved by detecting the voltage across capacitor 335, which is normally very large in value and therefore can take a very long period to discharge. However, in an alternative example for an embodiment, input voltage information may be derived from the voltage across capacitor C1 335 if a longer period to reset the power supply was acceptable. In such an embodiment, diode D3 315 and capacitor C3 325 would be eliminated and resistor 320 would be coupled between the feedback terminal EN 390 and the input DC rail at the positive terminal of capacitor C1 335. A resistor such as R2 330 could in that case be coupled across capacitor C1 335 to influence the time constant of the voltage across capacitor C1 335 and therefore the time taken to reset the power supply when the input voltage is removed. An example of a case where this type of embodiment might be used is when the power supply is fed with a DC rather than AC supply.

The voltage across capacitor C3 325 causes a current to flow through resistor 320. In the example of FIG. 3, controller U1 340 is adapted to sense a magnitude of current flowing through resistor 320 after regulation of the output parameter is lost. Circuitry internal to controller 340 sets a threshold value of this current referred to here as the line sense threshold current. For one embodiment, a current flowing in resistor 320 of less than this threshold value is interpreted as indicating that the AC input voltage is not high enough to allow the power converter to deliver the required energy to the power converter output load and bring the output parameter into regulation in accordance with the teachings of the present invention.

In case of a loss of regulation due to an output overload or a short circuit, controller U1 340 detects the loss of feedback signal coupled to the feedback terminal EN 390 by opto-coupler 385 and stops switching as described in FIG. 2. However, with the benefit of the teachings of the present invention, the controller 340 is able to determine the reason for this loss of regulation.

For example, if, after the detection of a loss of feedback signal, the current flowing through resistor 320 into feedback terminal EN 390 of controller 340 is above the line sense threshold, set by the circuitry internal to controller 340, the controller 340 initiates a latch off condition. This latch off condition is reset by removing or reducing the AC input voltage until the current flowing through resistor 320 is below the line sense threshold current of controller 340. It is appreciated that the line sense threshold current of controller 340 is typically set at a level corresponding to an AC voltage having for example 50 to 100 Volts peak voltage. Therefore to reset the latch off condition, it is not necessary to reduce the voltage across C1 335 to an extremely low level in order that the supply voltage at the BP pin of controller 340 is discharged in order to force the controller 340 through an internal start up sequence to reset. Instead it is possible to reset the latch off condition rapidly whilst capacitor C1 335 still has a high voltage across it. Following reset of the latch off condition as described above, when the AC input voltage is then increased such that the current flowing into feedback terminal EN 390 is again above the line sense threshold value, the power converter is restarted by controller 340. This functionality is as described in FIG. 2. The example of FIG. 3 is therefore an example of where the startup and restart thresholds are substantially equal as described in relation to FIG. 2. In the above example, before the loss of regulation, the current flowing through resistor 320 is not sensed and therefore during normal operation, the controller operation is unresponsive to the condition of this signal representative of the power converter input voltage in accordance with the teachings of the present invention.

For one embodiment, a degree of hysteresis may be applied to the line sense threshold current level. In the condition where the current flowing through resistor 320 is below the line sense threshold current, after a loss of regulation has been detected, the controller 340 sets an off period after which the controller attempts to restart the power converter if at the end of the off time period, the current flowing through resistor 320 is above the sense threshold current level. Again this is consistent with the flowchart of FIG. 2. In other examples, the line sense threshold could be a voltage threshold rather than a current threshold while still benefiting from the teachings of the present invention.

As shown, the circuit example of FIG. 3 employs a controller 340, which provides supply current to the internal circuitry using charge stored on bypass capacitor 345, which is derived from an internal regulator circuit of controller U1 340 coupled between the D terminal and the BP terminal of controller U1 340. In other examples, it is appreciated that the supply current for controller U1 340 to operate could be derived from a low voltage bias winding forming part of energy transfer element 350. In an example embodiment using a bias winding, the bias winding would output a signal that could be coupled to be received by controller U1 340 that is representative of the output of the power supply. In various examples, the signal output by the bias winding representative of the output of the power supply and received by the controller U1 340 could be a voltage of the bias winding or a current derived from the bias winding in accordance with the teachings of the present invention. The bias winding could therefore also be used to detect the loss of regulation at the output of converter 300. In a properly designed converter, the voltage appearing across a bias winding is substantially proportional to the output voltage of the converter. As such, an output overload or short circuit fault on the output of the power converter can be sensed by the bias winding voltage dropping below a threshold value. This operation is consistent with the description of FIG. 1B. Alternatively, an open control loop condition, for example if opto-coupler 385 fails as an open circuit, the consequent output over-voltage condition could again be sensed by the bias winding voltage rising above a threshold value. In yet another example where a bias winding is not used, a power converter output over-voltage condition could be sensed directly at the output of the power converter and a signal provided to the power supply controller to indicate this fault condition through a second optocoupler used specifically for the purpose in accordance with the teachings of the present invention.

Figure 4:
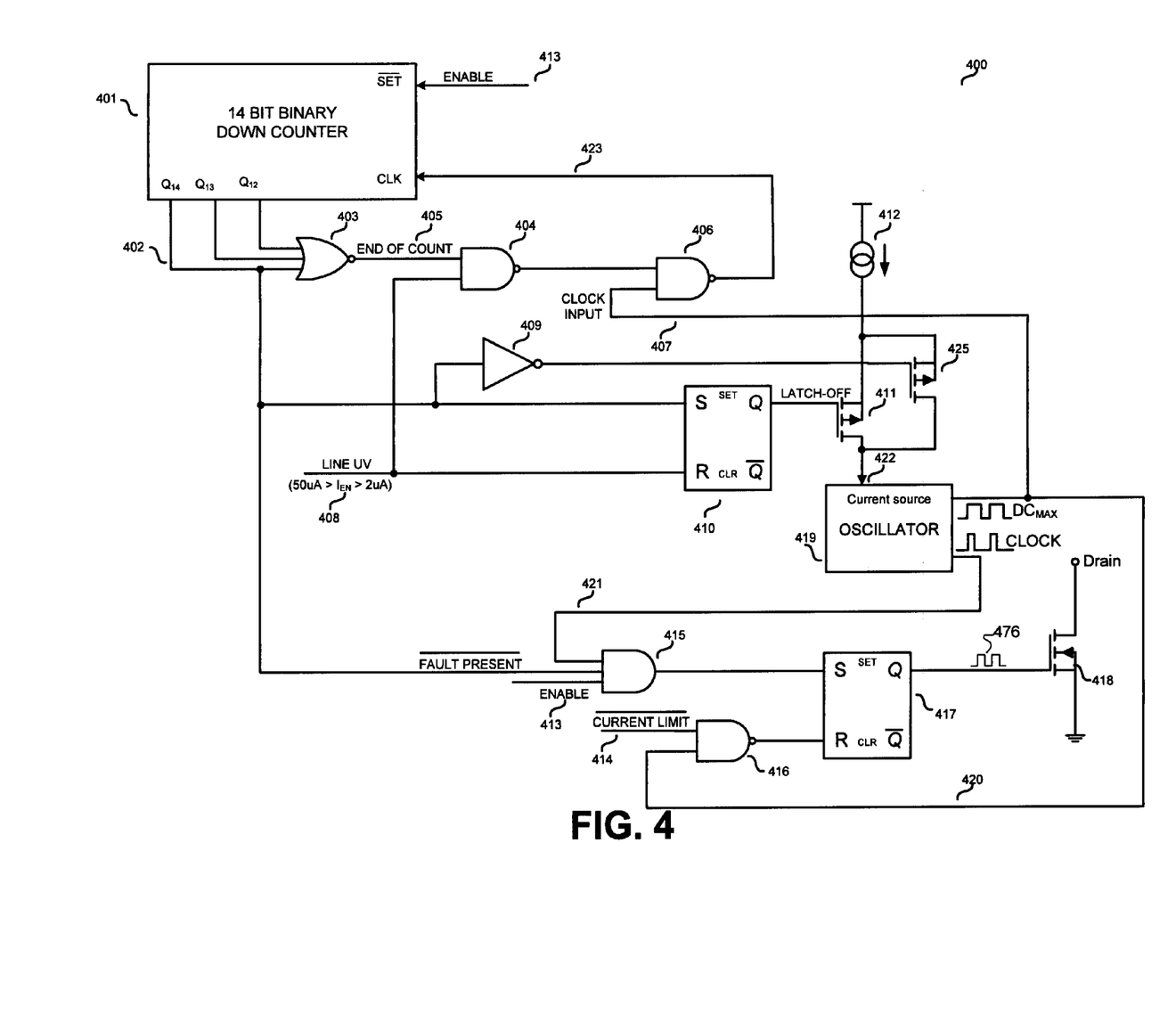
FIG. 4 is an example schematic for an embodiment of an integrated circuit included in a power converter in which there are conditional responses to fault conditions in accordance with the teaching of the present invention.

FIG. 4 shows a block diagram 400 of one example of a circuit providing conditional response to a fault condition in accordance with the teachings of the present invention. The example circuit shown in FIG. 4 would for example form part of the internal control circuitry of controller U1 340 in FIG. 3, or controller 175 and switch S1 125 of FIG. 1A, and/or form some of the operations shown in the flowchart of FIG. 2 in accordance with the teachings of the present invention.

As shown in the illustrated example, AND gate 415 has three input signals. During normal operation, at the beginning of each switch cycle of power switch 418, oscillator 419 generates a clock pulse 421. As illustrated in the depicted example, input 422 of oscillator 419 is coupled to receive current from current source 412 through MOSFET 411 and/or MOSFET 425. When oscillator 419 is supplied with current from current source 412, oscillation of oscillator 419 is enabled. Assuming there is no fault condition and the feedback signal represented internally as ENABLE signal 413 is high, the output of AND gate 415 goes high for the duration of the CLOCK signal 421, which sets latch or flip flop 417 turning on power switch 418. As shown, flip flop 417 generates drive signal 476, which is coupled to be received by switch 418 to control the switching of power switch 418. The time for which power switch 418 remains on is determined by the CURRENT LIMIT bar signal 414 and $DC_{MAX}$ signal 420. Either of these signals going low will reset flip flop 417 and terminate the on time of the power switch 418.

During normal operation, each time the ENABLE signal 413 goes low, counter 401 is set. However, under a fault condition where the ENABLE signal 413 is lost, which indicates a loss of regulation of the output in the circuit of FIG. 3 for example, and which in FIG. 2 corresponds to the YES output of block 230, counter 401 continues to count without being set by the ENABLE signal 413. Counter 401 is clocked at the oscillator frequency with signal 407 from oscillator 419.

For one embodiment, counter 401 is a down counter and therefore counts down from a condition where signals $Q_{12}$, $Q_{13}$ and $Q_{14}$ start high to one where they are low. For one embodiment, counter bits $Q_1$ to $Q_{11}$ are also included, but not shown in FIG. 4. Hence, in normal operating conditions, where $Q_{14}$ output of counter 401 is high, the output of inverter gate 409 is low, maintaining p channel MOSFET 425 in the on state, which allows the oscillator to be supplied by current source 412 and operate normally. Under the same conditions, S input to latch 410 and therefore Q output of latch 410 are therefore high, which ensures p channel MOSFET 411 is held off and plays no part in the operation of the oscillator regardless of the polarity of LINE UV signal 408. During normal operation therefore, the controller operation while regulating power is unresponsive to the condition of the signal representative of the power converter input voltage in accordance with the teachings of the present invention.

Under a fault condition however, when the counter 401 has been counting for the time period taken for $Q_{14}$ to go low, the circuit recognizes the fault condition. $Q_{14}$ output signal 402 goes low, preventing the power MOSFET 418 from switching because AND gate 415 output stays low regardless of the other input signals to AND gate 415. This corresponds to block 240 in FIG. 2.

As soon as $Q_{14}$ goes low, inverter 409 output goes high turning off p channel MOSFET 425. The response of latch 410 to $Q_{14}$ going low is dependent on the condition of the LINE UV signal 408.

In a first case, if LINE UV signal 408 is high, signaling for example that the power supply input voltage 305 in FIG. 3 is below a threshold value, then Q output of latch 410 goes low and p channel MOSFET 411 turns on allowing the oscillator to continue operating or oscillating. CLOCK INPUT 407 therefore continues to provide clock input signal 423 to the counter 401 and the counter continues to down count until $Q_{13}$ and $Q_{12}$ go low in common with $Q_{14}$ (which is already low from above). At this time, END OF COUNT signal 405 goes high. Since in this first case, LINE UV signal is also high, output of NAND gate 404 goes low and CLOCK INPUT 407 to NAND gate 406 is blocked from influencing the input CLK signal 423 to counter 401.

The counter 401 is therefore held in this condition until the LINE UV signal 408 goes low, which indicates for example the power supply input voltage 308 in FIG. 3 has risen above a threshold value. Under this condition, output of NAND gate 404 goes high and CLOCK INPUT 407 to NAND gate 406 is again able to clock the input CLK signal 423 to counter 401 at the frequency of the oscillator 419. The counter 401 then counts to the next state where $Q_1$ to $Q_{14}$ again go high, and the count starts again. Since $Q_{14}$ is now high, power MOSFET 418 is again allowed to switch depending on the states of the ENABLE 413 and CLOCK 421 inputs to AND gate 415. This series of events is corresponds to the YES output of block 280 and block 220 in FIG. 2.

In a second case, LINE UV signal 408 is low, signaling for example that the power supply input voltage 305 in FIG. 3 is above a threshold value, then Q output of latch 410 remains high and p channel MOSFET 411 is off, blocking current source 412 from supplying the oscillator 419. The oscillator 419 therefore ceases oscillating and CLOCK INPUT 407 therefore generates no clock input signal 423 to the counter 401. The counter 401 is then held in the current state, effectively latching this condition. Therefore, under this fault condition, the power converter is latched in the off state. In FIG. 2, this corresponds to the NO output of block 250 that latches the system in this off state. This condition continues to exist until LINE UV signal 408 goes high, which corresponds to the YES output of block 250 in FIG. 2.

The Q output of latch 410 is then reset low, which corresponds to block 260 in FIG. 2, and p channel MOSFET 411 is again turned on, allowing oscillator 419 to operate. This in turn allows counter 401 to continue counting down until $Q_{13}$ and $Q_{12}$ go low in common with $Q_{14}$. The time to count down to this state corresponds to block 270 in FIG. 2. At the end of this time, END OF COUNT signal 405 goes high. If LINE UV signal is high, output of NAND gate 404 goes low and CLOCK INPUT 407 to NAND gate 406 is blocked from influencing the input CLK signal 423 to counter 401. The counter is therefore held in this condition. This corresponds to the NO output of block 280 in FIG. 2.

When the LINE UV signal 408 goes low, which indicates for example the power supply input voltage 308 in FIG. 3 has risen above a threshold value, output of NAND gate 404 goes high and CLOCK INPUT 407 to NAND gate 406 is again able to clock the input CLK signal 423 to counter 401 at the frequency of the oscillator 419. The counter 401 then counts to the next state where $Q_1$ to $Q_{14}$ again go high, and the count starts again. Since $Q_{14}$ is now high, power MOSFET 418 is again allowed to switch depending on the states of the ENABLE 413 and CLOCK 421 inputs to AND gate 415. This series of events corresponds to the YES output of block 280 and block 220 in FIG. 2.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A power convener, comprising:
   an energy transfer element coupled between an input and an output of the power converter;
   a switch coupled to the input of the energy transfer element; and
   a controller circuit coupled to the switch and coupled to receive a feedback signal representative of the output of the power converter and coupled to receive a signal representative of the power converter input voltage, the controller circuit to control switching of the switch to provide a regulated output parameter at the output of the power converter in response to the feedback signal, the controller circuit coupled to latch the power converter into an off state in response to a detection of a loss of regulation of a power converter output parameter if the power converter input voltage is above a threshold level, the controller circuit to be unresponsive to the signal representative of the power converter input voltage while the power converter output parameter is in regulation.

2. The power converter of claim 1 wherein the regulated output parameter comprises a voltage at the output of the power converter.

3. The power converter of claim 1 wherein the regulated output parameter comprises a current at the output of the power converter.

4. The power converter of claim 1 wherein the regulated output parameter comprises a combination of a voltage and a current at the output of the power converter.

5. The power converter of claim 1 further comprising an oscillator coupled to a latch to generate a drive signal to control the switching of the switch.

6. The power converter of claim 5 wherein the latch is coupled to be reset when the voltage at the input of the power converter falls below a restart threshold level.

7. The power converter of claim 5 wherein the power converter is coupled to restart when the signal representative of the input of the power converter rises above a startup threshold level after the latch has been reset.

8. The power converter of claim 7 wherein the restart and startup threshold levels are substantially equal.

9. The power converter of claim 1 wherein the loss of regulation of the power converter output parameter is detected by a loss of the feedback signal received by the controller circuit.

10. The power converter of claim 1 wherein the loss of regulation of the power converter output parameter is detected in response to the voltage at the output of the power converter exceeding an over voltage threshold.

11. The power converter of claim 10 wherein the voltage at the output of the power converter exceeding the overvoltage threshold is detected directly at the output of the power converter.

12. The power converter of claim 10 wherein the energy transfer element further comprises a bias winding to generate an output signal representative of a voltage at the output of the power converter, wherein the voltage at the output of the power converter exceeding an over voltage threshold is detected by sensing the output signal generated by the bias winding.

13. The power converter of claim 1 wherein the energy transfer element further comprises a bias winding to generate an output signal representative of a voltage at the output of the power converter, wherein the loss of regulation of the power converter output parameter is detected by sensing the output signal generated by the bias winding.

14. A power converter, comprising:
   an energy transfer element coupled between an input and an output of the power converter;
   a switch coupled to the input of the energy transfer element; and
   a controller circuit coupled to the switch to control switching of the switch to regulate power delivered to a load to be coupled to the output of the power converter, the controller circuit coupled to receive a plurality of inputs some of which are adapted to detect a plurality of fault conditions in the power converter, wherein one of the plurality of inputs includes a signal representative of the power converter input voltage, the controller circuit coupled to latch the power converter into an off state in response to a detection of a fault condition in the power converter if the power converter input voltage is above a first threshold level, the controller circuit to be unresponsive to the signal representative of the power converter input voltage while the controller is regulating power delivered to the load.

15. The power converter of claim 14 wherein the power convener is coupled to be restarted when the power converter input voltage falls below a second threshold value and subsequently rises above the first threshold value.

16. The power converter of claim 15 wherein the first and second threshold values are substantially equal.

17. The power convener of claim 14 wherein the plurality of inputs includes a signal indicating a loss of regulation of an output parameter of the power converter.

18. The power converter of claim 14 wherein the plurality of inputs includes a signal representative of a temperature of a component within the power converter.

* * * * *